United States Patent
Cutting et al.

(10) Patent No.: US 6,453,039 B1
(45) Date of Patent: Sep. 17, 2002

(54) METHOD AND APPARATUS FOR ROBUST CALL ROUTING

(75) Inventors: Simon Cutting; Raechel Crosby, both of San Jose, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/334,192

(22) Filed: Jun. 16, 1999

(51) Int. Cl.[7] ................................................. H04M 3/00
(52) U.S. Cl. ............................. 379/265.11; 379/266.04
(58) Field of Search ..................... 379/265.11, 265.01, 379/266.04, 309, 212.01

(56) References Cited

U.S. PATENT DOCUMENTS

| | | | |
|---|---|---|---|
| 4,953,204 A | 8/1990 | Cuschleg, Jr. et al. | 379/266 |
| 5,247,569 A | 9/1993 | Cave | 379/113 |
| 5,265,157 A | 11/1993 | Jolissaint et al. | 379/386 |
| 5,381,415 A | 1/1995 | Mizutani | 370/110.1 |
| 5,530,744 A | 6/1996 | Charalambous et al. | 379/265 |
| 5,592,542 A | 1/1997 | Honda et al. | 379/265 |
| 5,727,047 A | 3/1998 | Bentley et al. | 379/93 |

*Primary Examiner*—Creighton Smith
(74) *Attorney, Agent, or Firm*—Chapin & Huang, L.L.C.; Barry W. Chapin

(57) ABSTRACT

Apparatus and method for performing a recoverable routing of calls using an automatic call distributor to avoid loss of calls at busy agent terminals. Switching equipment receives incoming calls and issues a routing request to a server. In response, the server returns the address of a quence to receive and hold the calls. Intermediate telephones are "punched into" the queue for receiving the calls from the queue, and the server detects transfer of calls to the intermediate telephones in order to obtain control of the calls. The server performs a consultative transfer of the calls from the intermediate telephones to agent terminals so that, if an agent terminal is busy, the server may transfer the call back to the switching equipment in order for the call to be rerouted.

20 Claims, 3 Drawing Sheets

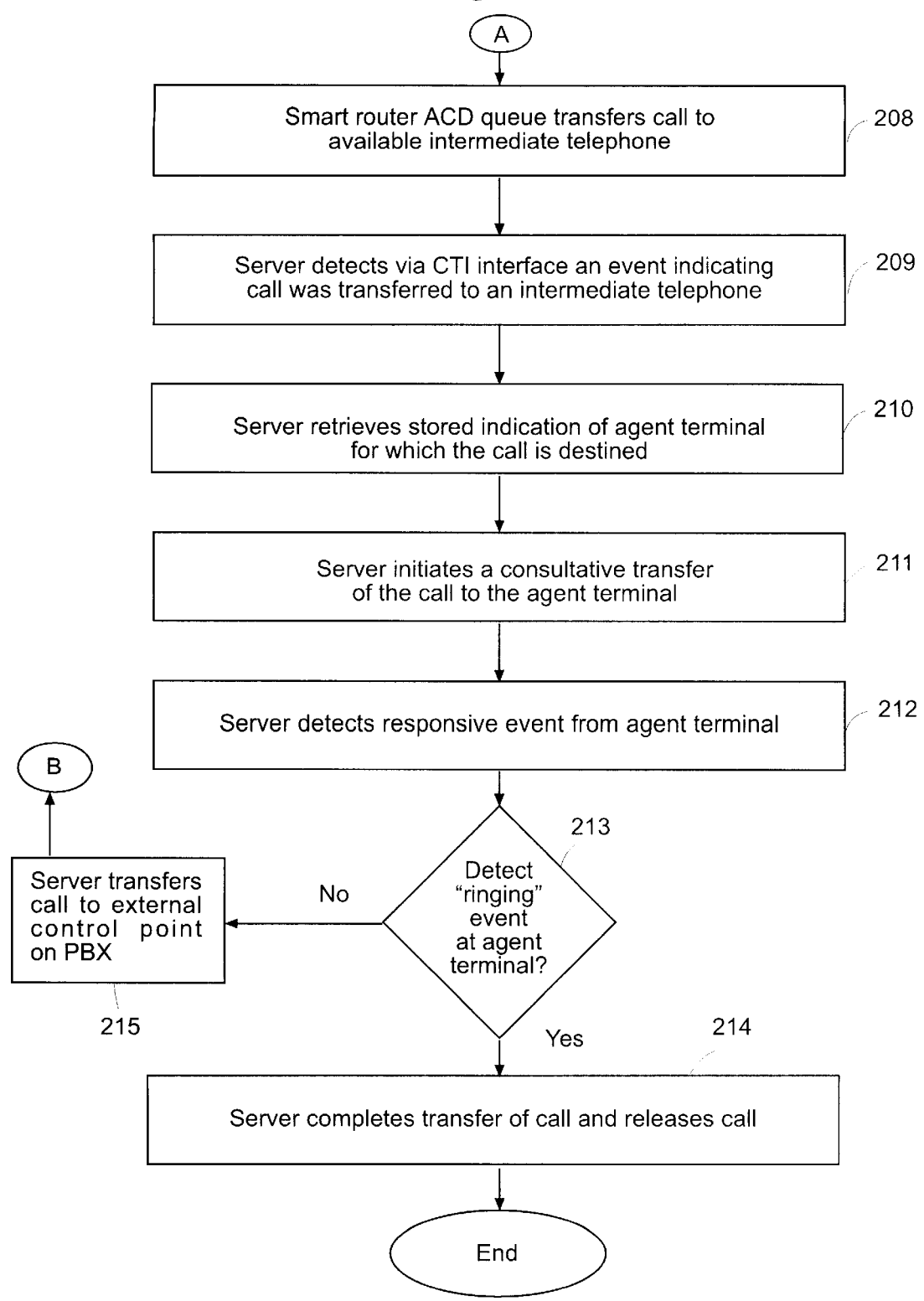

METHOD AND APPARATUS FOR ROBUST CALL ROUTING

REFERENCE TO RELATED APPLICATION

The present application is related to U.S. patent application Ser. No. 09/328,262 of Simon Cutting and Raechel Crosby, filed on even date herewith, and entitled "Method and Apparatus for Equitable Call Delivery," which is incorporated herein by reference as if fully set forth.

FIELD OF THE INVENTION

The present invention relates to an apparatus and method for routing calls in a robust way that helps ensure a customer call will not be lost during routing. A switching environment using the apparatus and method may contain automatic call distributors.

BACKGROUND OF THE INVENTION

Automatic call distributors (ACDs), also referred to as automatic call distribution systems, are computerized queues which are an adjunct to a private branch exchange (PBX) and route calls from customers waiting in the queue to agents who are members of the queue. Such systems are used, for example, in a company's customer service department receiving a high volume of calls. In order to efficiently process the incoming calls, the ACD selects an appropriate agent for a particular call and routes the call to a terminal for the agent. The agent terminal typically includes an associated computer so that the agent may access information from a database relevant to processing customer calls, such as relevant customer service information.

In some systems, incoming calls may be routed both by the ACDs within a PBX and other external processes. These external processes can achieve call control functionality at external control points within the PBX. However, if both the ACD and some external routing process attempt to simultaneously transfer calls to the same agent terminal, a situation referred to as a call collision may occur. In this situation, a call transferred from the ACD arrives first at the agent terminal and a time delay occurs in the external process being notified via a computer telephony integration (CTI) link that the agent terminal is busy. Before receiving the busy notification, the external routing process directs the PBX to route its call to the agent terminal as well, and that call will receive a busy signal, since the agent is processing the call from the ACD. Having received a busy signal, the call is unrecoverable from the PBX and hence lost, meaning that the caller must retry the call in order to obtain a connection with an agent. Lost calls reduce the effectiveness of an ACD in processing customer calls and result in poor customer service.

Accordingly, a need exists for an improved method of routing calls in a telephone system and for routing of calls from multiple sources to agents.

SUMMARY OF THE INVENTION

A method consistent with the present invention includes receiving from switching equipment a routing request for a call and returning an indication of an address for a queue in response to the routing request. Transfer of the call from the queue to an intermediate telephone is detected and control of the call is obtained at the intermediate telephone. A recoverable routing of the call is performed from the intermediate telephone to one of a plurality of agent terminals.

An apparatus consistent with the present invention receives from switching equipment a routing request for a call and returns an indication of an address for a queue in response to the routing request. The apparatus detects transfer of the call from the queue to an intermediate telephone and obtains control of the call at the intermediate telephone. A recoverable routing of the call is performed from the intermediate telephone to one of a plurality of agents terminals.

BRIEF DESCRIPTION OF THE DRAWINGS

The accompanying drawings are incorporated in and constitute a part of this specification and, together with the description, explain the advantages and principles of the invention. In the drawings, FIGS. 2A and 2B are a flow chart of a process for performing a recoverable routing of a customer call in the system of FIG. 1.

DETAILED DESCRIPTION

A system consistent with the present invention performs a recoverable routing of customer calls from switching equipment to one of a plurality of agent terminals. The system uses intermediate telephones in order to intercept the calls from the PBX. Upon intercepting the customer call, the system maintains control of the call so that if the intended agent terminal is busy, the system may redirect the call for further processing and to avoid losing the call. The system maintains an identification of the intermediate telephones and may direct the PBX to transfer the customer calls to one of the intermediate telephones via an intermediate ACD queue, which the intermediate telephones are members of. This use of intermediate telephones avoids routing calls directly to specific directory numbers and hence avoids potential loss of the calls if agent terminals are busy. Accordingly, with recoverable routing, if an attempted transfer of a call to a busy or otherwise unavailable agent terminal occurs, control of the call is maintained in order to reroute it and to help prevent loss of the call.

Figure 1:
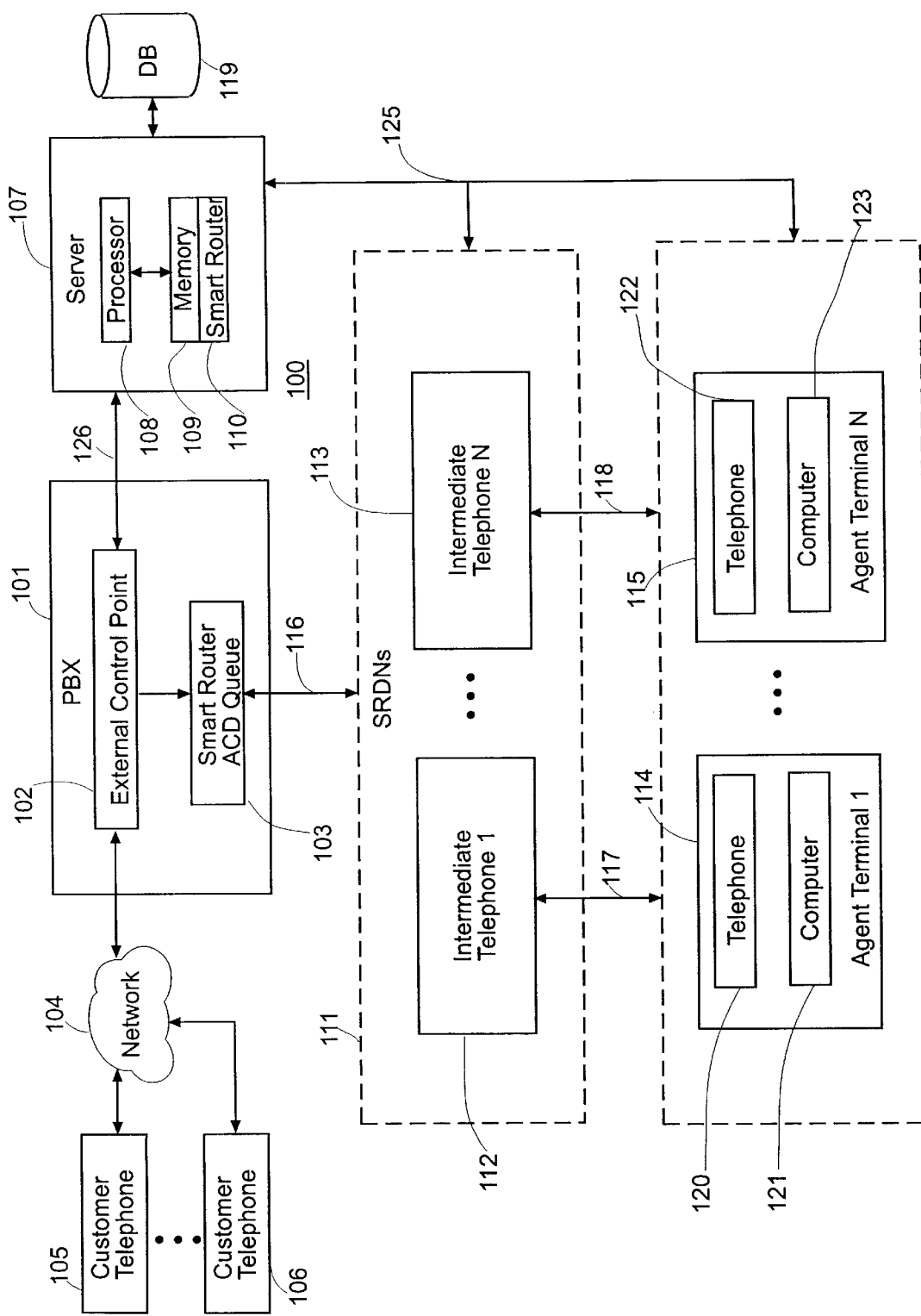
FIG. 1 is a block diagram of an exemplary system for performing a recoverable routing of customer calls to agent terminals.

FIG. 1 is a block diagram of an exemplary system 100 for performing a recoverable routing of customer calls to agent terminals. System 100 includes a PBX 101, which alternatively may be implemented with any type of switching equipment for routing calls. PBX 101 includes an external control point 102, a standard feature of a typical PBX. The phrase "external control point" refers to a point within switching equipment where an external router process can determine, if desired, the route destination of calls arriving at the point. In addition, PBX 101 includes a smart router ACD queue 103, which functions as a holding point for routing of calls to available agent terminals via the intermediate telephones. Smart router ACD queue 103 represents a queue reserved for the exclusive use of server 107, which provides an address or other information to PBX 101 for routing calls to smart router ACD queue 103. Only server 107 routes calls to smart router ACD queue 103 in this example; a customer cannot call the queue directly, and scripts or other functions in PBX 101 cannot route to it. The term "smart router ACD queue" is used only as a label for the queue, and a "queue" for implementing an embodiment consistent with the present invention may include any type of mechanism for holding or controlling routing of calls.

PBX 101 is coupled to a network 104, which receives customer calls from customer telephones 105 and 106. Customer telephones 105 and 106 may be implemented with any type of wireline or wireless telephone for voice communication, and the term "customer" is used only as a label, since ACDs are often used in an environment to service customers. However, customer telephones 105 and 106 may be used by anyone calling into PBX 101. Network 104 may include any type of network for routing calls, such as a public switched telephone network (PSTN), or other wide area or local area network.

PBX 101 is also coupled by external control point 102 to server 107 via connection 126. Server 107 may be implemented with any type of computer providing for CTI or other functions in order to manage the routing and distribution of customer calls from customer telephones 105 and 106. Server 107 includes a processor 108 coupled to a memory 109 for storing data and applications for execution by processor 108. Memory 109 stores an application referred to as a smart router 110 for providing processing to perform recoverable routing of customer calls. Server 107 may also be coupled to a database 119 providing secondary storage of information potentially relevant to customer calls. Therefore, server 107 may implement external router functionality or processes. An example of an external router process is the functionality provided by the Customer Contact Manager product by Hewlett-Packard Company.

PBX 101 via smart router ACD queue 103 is also coupled via connection 116 to a plurality of smart router directory numbers (SRDNs) 111, implemented using intermediate telephones 112 and 113. The term "SRDN" is used only as a label to identify the intermediate telephones by their directory numbers for purposes of routing calls. These intermediate telephones 112 and 113 may be implemented with conventional physical telephones, such as a telephone handset, coupled via switches to smart router ACD queue 103 in PBX 101. Alternatively, SRDNs 111 may be implemented with ports within the PBX 101 equipment. However, in some instances implementation may be facilitated by using external physical telephones rather than extensive modification of existing PBX equipment. Each of the intermediate telephones 112 and 113 in SRDNs 111 may be coupled to one of a plurality of agent terminals 114 and 115 via connections 117 and 118. Connections 117 and 118 typically are implemented by routing a call from one of the intermediate telephones 112 and 113 through a switch to the appropriate agent terminal.

Agent terminals 114 and 115 may be implemented with typical agent terminals within an ACD system. The terminals may include a telephone 120 and an associated computer 121 for agent terminal 114, and a telephone 122 and an associated computer 123 for agent terminal 115. The exemplary telephone in the agent terminal provides for voice communication with a customer during a customer call. The associated computer in the agent terminal may be linked via a CTI interface 125 with server 107 for accessing information in database 119 potentially relevant to the customer or for use in processing the customer call. Therefore, computer 121 and computer 123 may each include a processor, a memory for storing data and applications for execution by the processor, a display device such as a conventional computer monitor, and an input device such as a keyboard or cursor control device. An agent at one of the agent terminals 114 and 115 may thus process a customer call using a telephone and associated computer for entering and retrieving information relevant to the customer.

CTI interface 125 provides for server 107 to control transfer of calls from intermediate telephones 112 and 113 in SRDNs 111 to agent terminals 114 and 115. CTI interface 125 includes a connection to each of the intermediate telephones 112 and 113, and CTI interface 125 is also coupled to computers 121 and 123 within agent terminals 114 and 115 such as that an agent at those terminals may access information in server 107 or database 119 for processing customer calls. CTI interface 125 is also connected to telephones 120 and 122 in agent terminals 114 and 115 for use in transferring calls to those telephones and so that server 107 may monitor a status of agent terminals 114 and 115.

CTI interfaces are known in the art with respect to, for example, known ACD systems. Although agent terminals 114 and 115 are shown with computers 121 and 123, respectively, agent terminals may include a telephone without an associated computer, and in addition agent terminals may include a stand-alone computer without connection to a CTI interface. In addition, CTI interface 125 may be implemented with any type of connection for monitoring and controlling the routing of calls. Although only two intermediate telephones and two agent terminals are shown, system 100 may include any number of intermediate telephones and agent terminals.

Figure 2A:
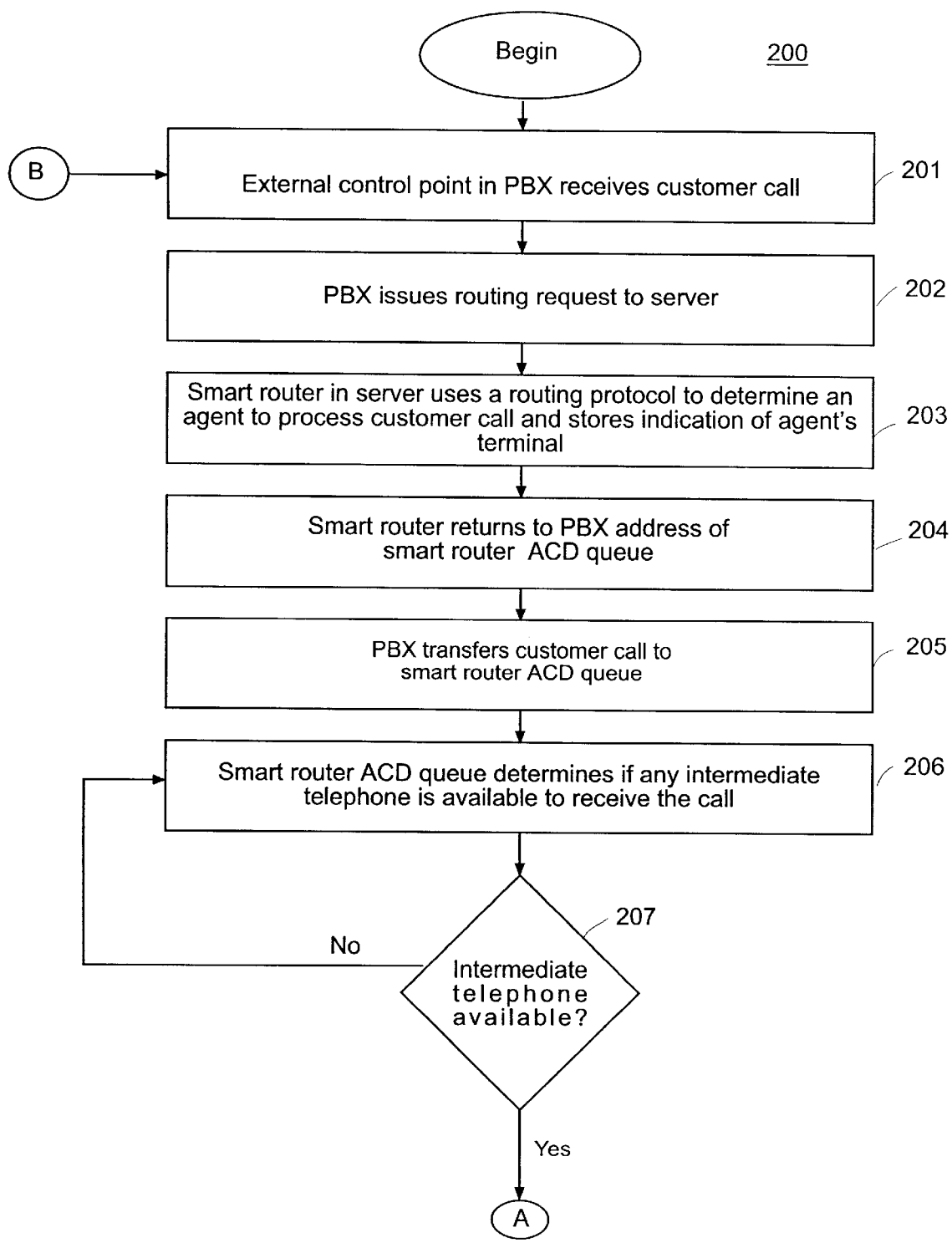

FIGS. 2A and 2B are a flowchart of a process 200 for performing a recoverable routing of customer calls in system 100. Process 200 may be implemented as smart router application 110 in memory 109 for execution by processor 108 in server 107. Server 107, upon executing process 200, may use CTI interface 125 to control the routing of customer calls from PBX 101. Therefore, process 200 may be implemented by software modules stored in memory 109 or received from another source, or alternatively by hardware modules or a combination of software and hardware modules. In addition, the application or other information for executing the process may also be stored on or read from other types of computer program products or computer-readable media, such as secondary storage devices, including hard disks, floppy disks, or CD-ROM; a signal from a network; or other forms of RAM or ROM. The computer-readable media may include instructions for controlling a computer system, such as processor 108, to perform a particular method such as that shown in FIGS. 2A and 2B.

In process 200, external control point 102 in PBX 101 receives a customer call through network 104 from one of the customer telephones 105 or 106 (step 201). PBX 101 issues a routing request to server 107 via connection 126, requesting information required or used to route the call (step 202). The routing request may include an identification of the customer call. For example, in certain ACD systems, a PBX may be programmed to prompt a caller with particular questions and in response to received numbers entered via a touch-tone telephone. PBX 101 may thus transmit that information providing some identification of the customer call to server 107.

In response, smart router 110 upon execution by processor 108 uses a routing protocol to determine an agent to process the customer call, and it stores in memory 109 an indication of the agent's terminal for future reference in routing the call (step 203). Routing protocols or routing rules are known in the art and may use the received information identified in the customer call in order to select an appropriate agent for processing the call. For example, smart router 110 may access in memory 109 a stored order of agent terminals and sequence through the agent terminals to assign the call to the first available agent. As another example of a routing protocol, smart router 110 may assign the call to the agent terminal that has handled the fewest number of pending calls within a particular time frame. Vendors of ACDs typically define their own routing protocols for use with associated switching equipment; for example, the Customer Contact Manager product identified above has its own routing protocol.

In response to the routing request, smart router 110 via server 107 returns to PBX 101 an address of smart router ACD queue 103 (step 204). Therefore, instead of returning the direct address of the selected agent terminal, server 107 instead returns an address of smart router ACD queue 103 so that PBX 101 will transfer the call to that queue and server 107 will retain control of the customer call. The address of smart router ACD queue 103 includes information identifying a location of the queue, such as a directory number, to enable PBX 101 to transfer a call to that queue.

PBX 101 transfers the customer call from external control point 102 to smart router ACD queue 103 using the received address from server 107 (step 205). Smart router ACD queue 103 determines if any intermediate telephone in SRDNs 111 are available to receive the call (step 206). This process may be accomplished by determining a state of agent terminals 114 and 115 as well as by analyzing which agent terminals are "punched into" to smart router ACD queue 103. The phrase "punched into" means that smart router ACD queue 103 includes a directory number for a particular intermediate telephone and knows that a particular intermediate telephone is available to receive a call. This functionality for step 206 is typically provided by software within PBX 101 or other switching equipment, and such software is provided by the vendors for known PBX's or other switching equipment. Therefore, smart router ACD queue 103 only transfers a call to an intermediate telephone that is punched into the smart router ACD queue. Switches in known PBX equipment typically use a hardware mechanism to identify which telephones are punched into a queue in the PBX and to automatically transfer calls from the queue to one of those telephones. Using a queue, such as smart router ACD queue 103, also ensures that calls will not be lost between external control point 102 and SRDNs 111; smart router ACD queue 103 thus may function as a holding point for calls while an available one of the SRDNs 111 is identified.

If one of the intermediate telephones 112 or 113 in SRDNs 111 is available to receive a call (step 207), smart router ACD queue 103 transfers the customer call to the available intermediate telephone 112 or 113 (step 208). By monitoring CTI interface 125, server 107 detects via CTI interface 125 an event indicating the customer call was transferred to one of the intermediate telephones 112 or 113 (step 209). Events for monitoring calls are known in the art with respect to CTI, and an event includes any type of information providing an indication of a status of a call. In response, server 107 retrieves the stored indication of the agent terminal 114 or 115 for which the call is destined, as determined by the routing protocol in step 203 (step 210).

Server 107 then initiates a consultative transfer from the intermediate telephone to the agent terminal for which the call is destined in order to determine if the agent terminal is available to receive the customer call (step 211). A consultative transfer refers to an example of a transfer to implement a recoverable routing such that, if the attempted transfer of the call to a busy or otherwise unavailable agent terminal occurs, control of the call is maintained in order to reroute it and to help prevent loss of the call. The consultative transfer may be accomplished by a consult call in which server 107 consults an agent terminal to determine if it is available by attempting to connect a call with the agent terminal; if it receives a "busy" signal it does not transfer the call, and if it receives a "ringing" indication it does transfer the call. The consultative transfer thus may be implemented by the customer call being on hold within the intermediate telephone 112 or 113 and by server 107 attempting to access the agent terminal telephone 120 or 122 and determining if it receives a ringing event in response. Therefore, server 107 detects via CTI interface 125 a responsive event from the agent terminal when it tries to establish a connection with the agent terminal (step 212).

If server 107 detects a ringing event at the agent terminal 114 or 115, indicating successful transfer to the agent terminal (step 213), server 107 completes the transfer of the call from the intermediate telephone 112 or 113 to the agent terminal and releases its control of the call so that it may be processed by the agent terminal (step 214). A ringing event is known in CTI and provides an indication that the call is "ringing" at the agent terminal to which it was transferred, or was otherwise successfully transferred, and is waiting to be answered at the agent terminal. If server 107 did not detect a ringing event and instead detected, for example, a busy event, server 107 transfers the customer call to external control point 102 on PBX 101 so that the call may again be processed beginning at step 201 to avoid the customer call receiving a busy signal and being lost in connection with transfer to an agent terminal (step 215).

While the present invention has been described in connection with an exemplary embodiment, it will be understood that many modifications will be readily apparent to those skilled in the art, and this application is intended to cover any adaptations or variations thereof. For example, different switching equipment and types of agent terminals may be used without departing from the scope of the invention. This invention should be limited only by the claims and equivalents thereof.

What is claimed is:

1. A method for routing calls to one of a plurality of agent terminals through a telephone network, comprising:

receiving from switching equipment a routing request for a call;

returning an indication of an address for a queue in response to the routing request;

detecting transfer of the call from the queue to an intermediate telephone;

obtaining control of the call at the intermediate telephone; and performing a recoverable routing of the call from the intermediate telephone to one of the plurality of agent terminals.

2. The method of claim 1 wherein the performing step includes:

determining that the one agent terminal is unavailable; and transferring the call back to the switching equipment in response to the determining.

3. The method of claim 1 wherein the performing step includes:

using a processor to obtain control of the call from the intermediate telephone; and using the processor to perform the recoverable routing of the call.

4. The method of claim 1, further including assigning the call to one of a plurality of agent terminals.

5. The method of claim 4 wherein the performing step includes attempting to route the call to the assigned agent terminal.

6. The method of claim 1 wherein the performing step includes:

performing a consultative transfer of the call from the intermediate telephone to the one agent terminal; and detecting an event providing an indication whether the call was successfully transferred to the one agent terminal.

7. The method of claim 6 wherein the performing step includes transferring the call back to the switching equipment, if the event indicates that the call was not successfully transferred to the one agent terminal.

8. The method of claim 6 wherein the performing step includes releasing control of the call, if the event indicates that the call was successfully transferred to the one agent terminal.

9. The method of claim 1 wherein the receiving step includes receiving the routing request from a private branch exchange.

10. An apparatus for routing calls to one of a plurality of agent terminals through a telephone network, comprising:

a module for receiving from switching equipment a routing request for a call;

a module for returning an indication of an address for a queue in response to the routing request;

a module for detecting transfer of the call from the queue to an intermediate telephone;

a module for obtaining control of the call at the intermediate telephone; and a module for performing a recoverable routing of the call from the intermediate telephone to one of the plurality of agent terminals.

11. The apparatus of claim 10 wherein the performing module includes:

a module for determining that the one agent terminal is unavailable; and a module for transferring the call back to the switching equipment in response to the determining module.

12. The apparatus of claim 10 wherein the performing module includes a processor, operating under software control, to obtain control of the call from the intermediate telephone and to perform the recoverable routing of the call.

13. The apparatus of claim 10, further including a module for assigning the call to one of a plurality of agent terminals.

14. The apparatus of claim 13 wherein the performing module includes a module for attempting to route the call to the assigned agent terminal.

15. The apparatus of claim 10 wherein the performing module includes:

a module for performing a consultative transfer of the call from the intermediate telephone to the one agent terminal; and a module for detecting an event providing an indication whether the call was successfully transferred to the one agent terminal.

16. The apparatus of claim 15 wherein the performing module includes a module for transferring the call back to the switching equipment, if the event indicates that the call was not successfully transferred to the one agent terminal.

17. The apparatus of claim 15 wherein the performing module includes a module for releasing control of the call, if the event indicates that the call was successfully transferred to the one agent terminal.

18. The apparatus of claim 10 wherein the receiving module includes a module for receiving the routing request from a private branch exchange.

19. A system for routing calls to one of a plurality of agent terminals through a telephone network, comprising:

switching equipment for routing calls, the switching equipment including an associated queue;

a plurality of intermediate telephones operatively coupled to receive calls from the switching equipment;

a plurality of agent terminals operatively coupled to receive calls from the intermediate telephones; and a processor, operatively coupled to the switching equipment, the intermediate telephones, and the agent terminals, for controlling routing of calls, the processor operating to:

receive from the switching equipment a routing request for a call;

return to the switching equipment an indication of an address for the associated queue in response to the routing request;

detect transfer of the call from the associated queue to one of the intermediate telephones;

obtain control of the call at the one intermediate telephone; and perform a recoverable routing of the call from the one intermediate telephone to one of the plurality of agent terminals.

20. The system of claim 19, further including a computer telephony integration interface for the operative coupling of the processor to the switching equipment, the intermediate telephones, and the agent terminals.

\* \* \* \* \*